(12) United States Patent
Burgwin et al.

(10) Patent No.: US 10,768,061 B2
(45) Date of Patent: Sep. 8, 2020

(54) OPTICAL SENSOR HAVING π-PHASE SHIFTED BRAGG GRATING AND OPTICAL SENSING SYSTEM USING SAME

(71) Applicant: FIBOS INC., Toronto (CA)

(72) Inventors: Nicholas Burgwin, Toronto (CA); Michael Bakaic, Toronto (CA); Xijia Gu, Toronto (CA)

(73) Assignee: FIBOS INC., Toronto (CA)

( * ) Notice: Subject to any disclaimer, the term of this patent is extended or adjusted under 35 U.S.C. 154(b) by 168 days.

(21) Appl. No.: 15/935,819

(22) Filed: Mar. 26, 2018

(65) Prior Publication Data

US 2018/0372566 A1 Dec. 27, 2018

Related U.S. Application Data

(60) Provisional application No. 62/525,476, filed on Jun. 27, 2017.

(51) Int. Cl.
| | | |
|---|---|---|
| *G01L 1/24* | (2006.01) | |
| *G01L 11/02* | (2006.01) | |
| *G01L 9/00* | (2006.01) | |

(52) U.S. Cl.
CPC ............ *G01L 1/246* (2013.01); *G01L 9/0076* (2013.01); *G01L 11/025* (2013.01)

(58) Field of Classification Search
CPC ....... G01L 1/246; G01L 9/0076; G01L 11/025
USPC ........................................ 250/227.14, 227.16
See application file for complete search history.

(56) References Cited

U.S. PATENT DOCUMENTS

| | | |
|---|---|---|
| 6,233,374 B1 | 5/2001 | Ogle et al. |
| 6,398,778 B1 * | 6/2002 | Gu ................ G02B 6/0008 356/72 |
| 6,661,941 B1 | 12/2003 | Yao |
| 6,789,424 B2 | 9/2004 | Knudsen et al. |
| 7,800,763 B1 | 11/2010 | Gee et al. |
| 7,920,270 B2 | 4/2011 | Chow et al. |
| 7,970,025 B2 | 6/2011 | Livas et al. |
| 8,726,732 B2 | 5/2014 | Littler et al. |
| 2002/0154860 A1 | 10/2002 | Fernald et al. |
| 2011/0229071 A1 | 9/2011 | Vincelette et al. |
| 2015/0330848 A1 | 11/2015 | Digonnet et al. |

(Continued)

FOREIGN PATENT DOCUMENTS

| | | |
|---|---|---|
| CN | 102829806 B | 12/2014 |
| EP | 2021741 B1 | 8/2012 |

OTHER PUBLICATIONS

Zhang, Qi, Fiber-Optic π-Phase-Shifted Bragg Grating and its Application in Sensor, University of Nebraska, Lincoln, 2015.

(Continued)

*Primary Examiner* — Kevin K Pyo
(74) *Attorney, Agent, or Firm* — Norton Rose Fulbright Canada LLP; Reno Lessard

(57) ABSTRACT

The optical sensor generally has a frame having a deformable member mounted to the frame, and a sensing optical fiber being fixedly attached to a portion of the deformable member, the sensing optical fiber having at least one π-phase-shifted fiber Bragg grating inscribed thereon, the at least one π-phase-shifted fiber Bragg grating of the sensing optical fiber deforming together with the deformable member when the frame is subjected to a force.

20 Claims, 9 Drawing Sheets

(56) References Cited

U.S. PATENT DOCUMENTS

2015/0338286 A1    11/2015    Andrejco et al.

OTHER PUBLICATIONS

Liu, Tongqing and Ming Han, Analysis of Fiber Bragg Gratings for Ultrasonic Detection, Theses, Dissertations, and Student Research from Electrical & Computer Engineering, University of Nebraska, Lincoln, 2012.
Zhang, Qi et al, Fiber-Optic Pressure Sensor Based on π-Phase-Shifted Fiber Bragg Grating on Side-Hole Fiber, IEEE photonics technology letters 24.17 (2012) 1519-1522.
Gatti et al. "Fiber strain sensor based on a π-phase-shifted Bragg grating and the Pound-Drever-Hall technique" Optical Society of America, Optics Express, vol. 16, No. 3, Feb. 4, 2008.

\* cited by examiner

OPTICAL SENSOR HAVING π-PHASE SHIFTED BRAGG GRATING AND OPTICAL SENSING SYSTEM USING SAME

FIELD

The improvements generally relate to optical gauge sensors and more particularly to optical gauge sensors incorporating at least one optical fiber.

BACKGROUND

Electrical strain sensors such as resistive foil sensors and piezoelectric-based sensors have been used. However, existing electrical strain sensors are generally susceptible to electromagnetic radiation and/or ionization radiation. They also have a limited transmission distance and they are not intrinsically safe. At least some of these drawbacks can be overcome by using optical strain sensors having Fiber Bragg Gratings (FBGs) embedded within an optical fiber to measure strain and/or temperature.

FBGs have been used extensively in the telecommunication industry. Indeed, FBGs can be used as wavelength selectable mirrors, where some wavelengths of light are reflected, while some other wavelengths of light are allowed to pass through. One FBG manufacturing technique involves shining a UV optical beam onto a core of an optical fiber to inscribe a periodic pattern within the core, over a small length thereof. The periodic pattern includes variations of the refractive index of the core of the optical fiber, which can act as reflective interfaces for at least some wavelengths, generally referred to as the Bragg wavelength $\lambda B$. The Bragg wavelength $\lambda B$ of a FBG is a function of the periodic pattern which is inscribed in the core of the optical fiber. Accordingly, changing the spacing distance between two successive variations of the refractive index (i.e. the pitch) correspondingly changes the Bragg wavelength $\lambda B$.

Although useful for managing different wavelengths in telecommunications, FBGs can also be used in strain sensing applications. Indeed, applying a strain to an optical fiber having a FBG inscribed in its core will modify the length of the optical fiber which will, in turn, change the pitch the Bragg wavelength $\lambda B$ of its FBG. This change can be monitored, enabling strain measurements to be performed optically.

By performing strain measurements using optical strain sensors, at least some benefits can be achieved over conventional electrical strain sensors. For instance, the measurement is no longer susceptible to electromagnetic interference, allowing these optical strain sensors to be positioned near highly electromagnetic interference emitting devices such as electric generators and/or transformers. Further, when the FBGs are manufactured in radiation hardened optical fibers, the possibility of monitoring temperature and/or strain in high ionizing radiation areas can be possible. Optical strain sensors also require no electrical energy at the point of measurement, and as a result, can be made intrinsically safe, enabling measurements to be performed in hazardous environments without introducing spark risks. Moreover, thermally stable FBGs can also be made, enabling strain measurements to be made at temperatures above 1000° C. for instance.

Although existing optical strain sensors have been found to be satisfactory to a given extent, there remains room for improvement; for instance, in providing optical strain sensors with increased resolution.

SUMMARY

In accordance with one aspect, there is provided an optical sensor comprising a frame having a deformable member mounted to the frame, and a sensing optical fiber being fixedly attached to a portion of the deformable member, the sensing optical fiber having at least one π-phase-shifted fiber Bragg grating inscribed thereon, the at least one π-phase-shifted fiber Bragg grating of the sensing optical fiber deforming together with the deformable member when the frame is subjected to a force.

In accordance with one aspect, there is provided an optical sensing system comprising: an optical sensor; a frame having a deformable member mounted to the frame, and a sensing optical fiber being fixedly attached to a portion of the deformable member, the sensing optical fiber having at least one π-phase-shifted fiber Bragg grating inscribed thereon, the at least one π-phase-shifted fiber Bragg grating of the sensing optical fiber deforming together with the deformable member when the frame is subjected to a force; and a signal conditioner optically coupled to the sensing optical fiber, the signal conditioner being adapted and configured to measure a Bragg wavelength shift $\Delta\lambda B$ of the π-phase-shifted fiber Bragg grating and to generate a signal representative of the Bragg wavelength shift $\Delta\lambda B$; and a computer communicatively coupled to the signal conditioner and being configured to sense a measurand of interest based on the Bragg wavelength shift $\Delta\lambda B$ and on known properties of the optical sensor.

Many further features and combinations thereof concerning the present improvements will appear to those skilled in the art following a reading of the instant disclosure.

DESCRIPTION OF THE FIGURES

In the figures,

FIG. 6A is a top view of the optical sensor of FIG. 6;

DETAILED DESCRIPTION

Figure 1:
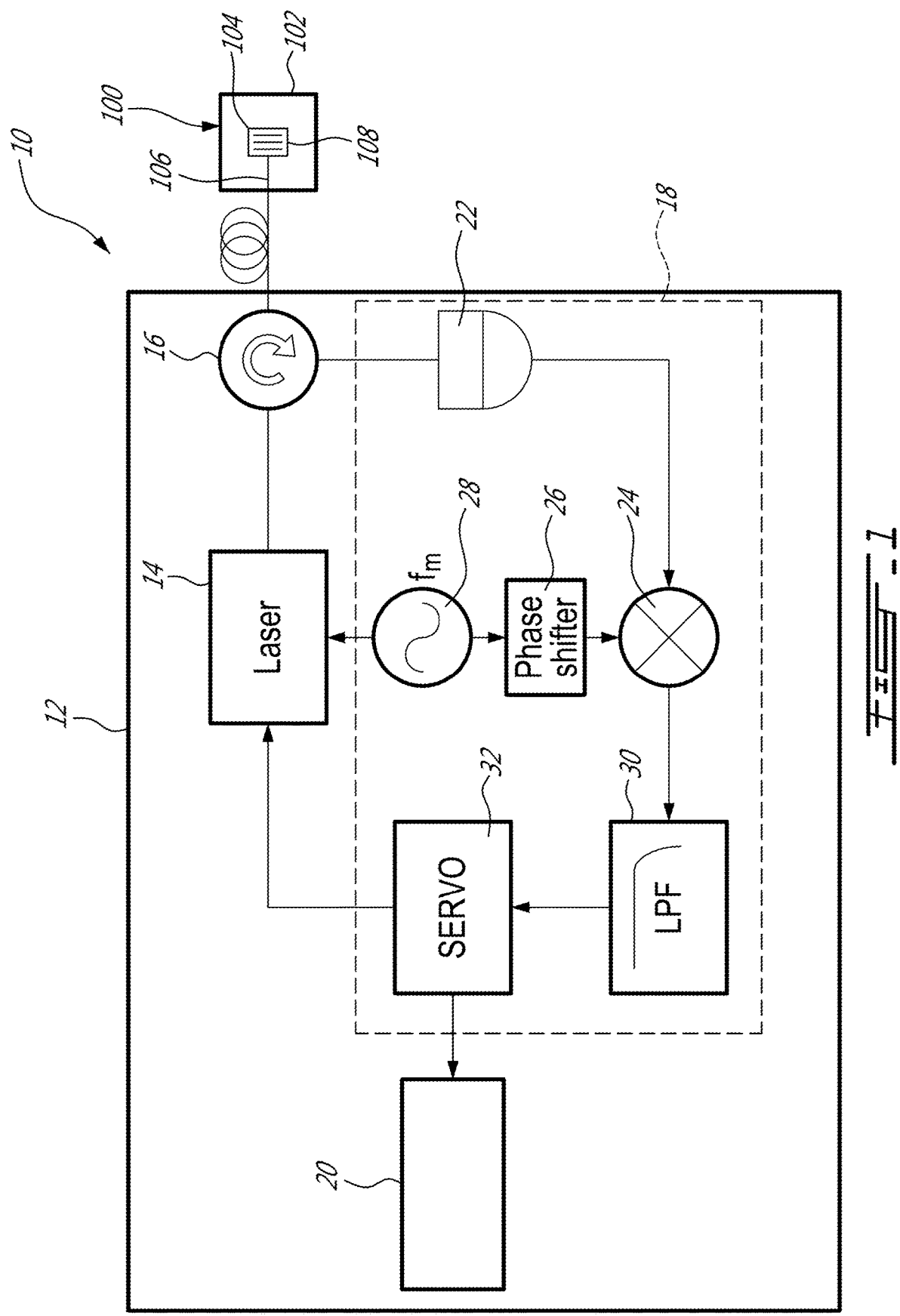
FIG. 1 is a schematic view of an example of an optical sensing system, incorporating an optical sensor and a signal conditioner.

FIG. 1 shows an example of an optical sensing system 10, in accordance with an embodiment. As will be understood from the following description, the optical sensing system 10 can be used for sensing strain, temperature, load, acceleration, pressure, flow, torque, level and/or any other suitable measurand, depending on the embodiment.

As depicted, the optical sensing system 10 has a signal conditioner 12 and an optical sensor 100.

The optical sensor 100 has a frame 102 with a deformable member 104 mounted to the frame 102, and a sensing optical fiber 106, which is fixedly attached to a portion of the deformable member 104. The sensing optical fiber 106 has at least one π-phase-shifted fiber Bragg grating 108 inscribed thereon. As will be understood, the π-phase-shifted fiber Bragg grating 108 of the sensing optical fiber 106 deforms together with the deformable member 104 when the frame 102 is subjected to a force.

The signal conditioner 12 has an optical source 14 for emitting an optical signal and an optical coupler 16 for coupling the optical signal into the sensing optical fiber 106. A Bragg wavelength shift monitoring subsystem 18 is provided for monitoring the Bragg wavelength λB of the π-phase-shifted fiber Bragg grating 108 over time. A computer 20 is used to sense and/or store the measurand of interest based on shift(s) of the Bragg wavelength λB over time.

In this example, the Bragg wavelength shift monitoring sub subsystem 18 has a Pound-Drever-Hall configuration. More specifically, the Bragg wavelength shift monitoring sub subsystem 18 has a photodiode 22, a mixer 24, a phase shifter 26, a frequency modulator 28, a low pass filter 30 and a servo 32. The Bragg wavelength shift monitoring sub subsystem 18 modulates the optical source 14 with phase or frequency modulation. When the wavelength of the optical signal matches the Bragg wavelength λB of the π-phase-shifted Fiber Bragg Grating 108, a phase-shifted optical reflection is created. This reflection signal is demodulated to produce an error signal that is proportional to the Bragg wavelength shift ΔλB, and therefore proportional to the strain experienced by the π-phase-shifted fiber Bragg grating 108.

Figure 2:
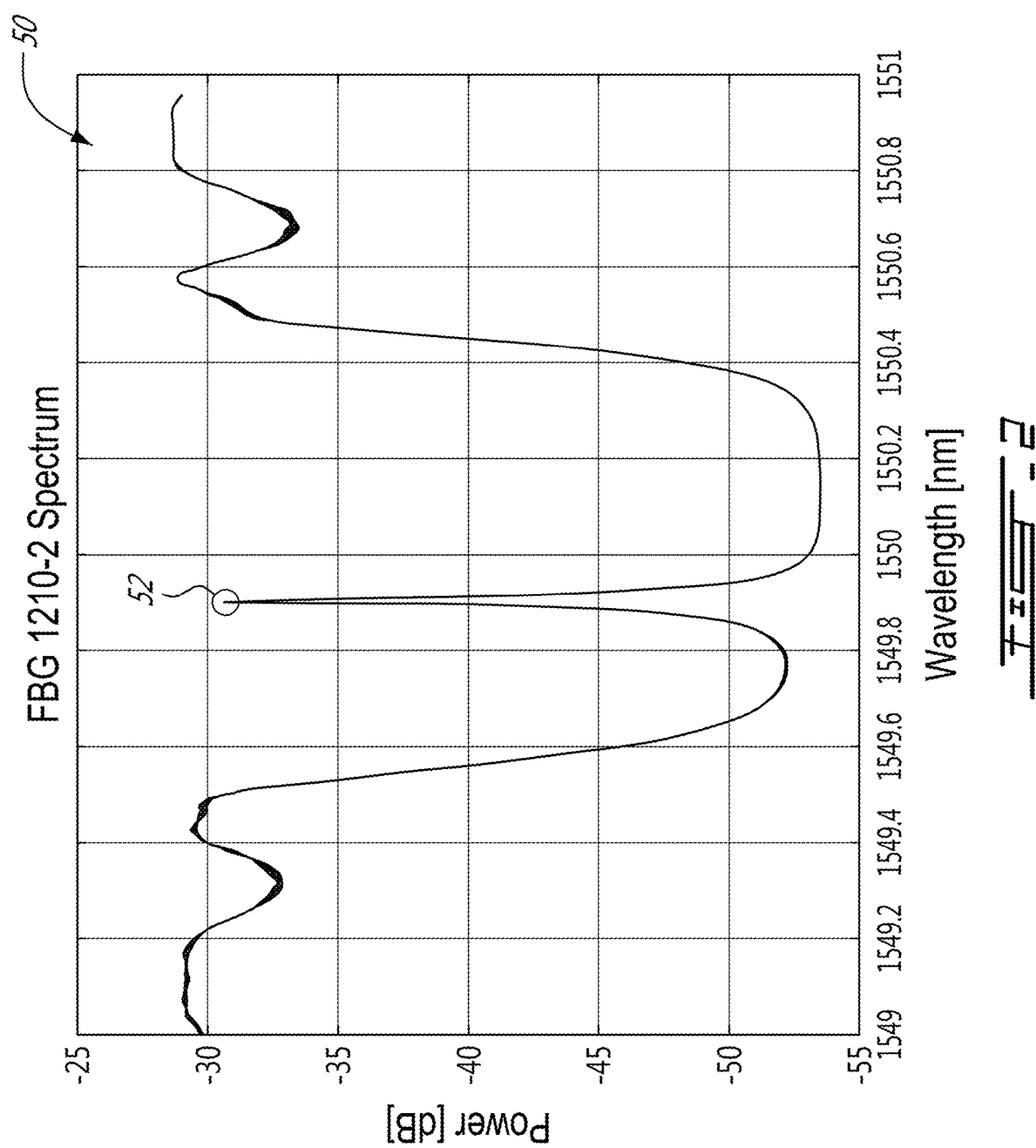
FIG. 2 is a graph showing an example of a filter function of a π-phase-shifted fiber Bragg grating.

FIG. 2 shows an example of a filter function 50 which is characteristic of a π-phase-shifted fiber Bragg grating 108. In this example, the π-phase-shifted fiber Bragg grating 108 is birefringence-free so its filter function 50 exhibits only one resonance peak 52.

One benefit of using the π-phase-shifted fiber Bragg grating 108 is that its resonance peak 52 can have a full width at half maximum (FWHM) of below 2 μm, as opposed to traditional FBGs which have resonance peaks having FWHMs ranging between 0.1 nm and 0.5 nm. Accordingly, the narrowness of the resonance peak 52 of the filter function 50 allows to increase the resolution at which the Bragg wavelength shift ΔλB can be monitored, and in turn, allows strain measurements of increased resolution. For instance, with the filter function 50 of the π-phase-shifted fiber Bragg grating 108, the resolution of strain measurements has been increased by a factor 100.

One other benefit of using the π-phase-shifted fiber Bragg grating 108 is that each time the signal conditioner 12 is turned on to follow the Bragg wavelength λB of the resonance peak, the signal conditioner 12 will always follow the Bragg wavelength shift ΔλB of the same peak, as there is only the resonance peak 52 to follow. This can be advantageous compared to optical sensors incorporating a π-phase-shifted fiber Bragg grating having two resonance peaks due to birefringence or optical sensors incorporating a Fabry-Perot interferometer having a multitude of resonance peaks.

The signal conditioner 12 can be used to monitor multiple different π-phase-shifted fiber Bragg gratings at different wavelengths, if multiple optical sources at those respective wavelengths are used as well. By using the optical sensing system 10, the measurement bandwidth can be significantly increased to compete against traditional electrical gauge technologies, and the strain resolution can be improved to monitor sub-nano-strain changes in the optical sensor 100. Such an optical sensor can operate from cryogenic temperatures to 1000° C., while monitoring accelerations of ±500 g at a frequency of 10 kHz or higher. These benefits enable force measurement optical sensors to be developed such as load cells, accelerometers, pressure transducers, or temperature cells, examples of which are described with reference to FIGS. 3-9.

Figure 3:
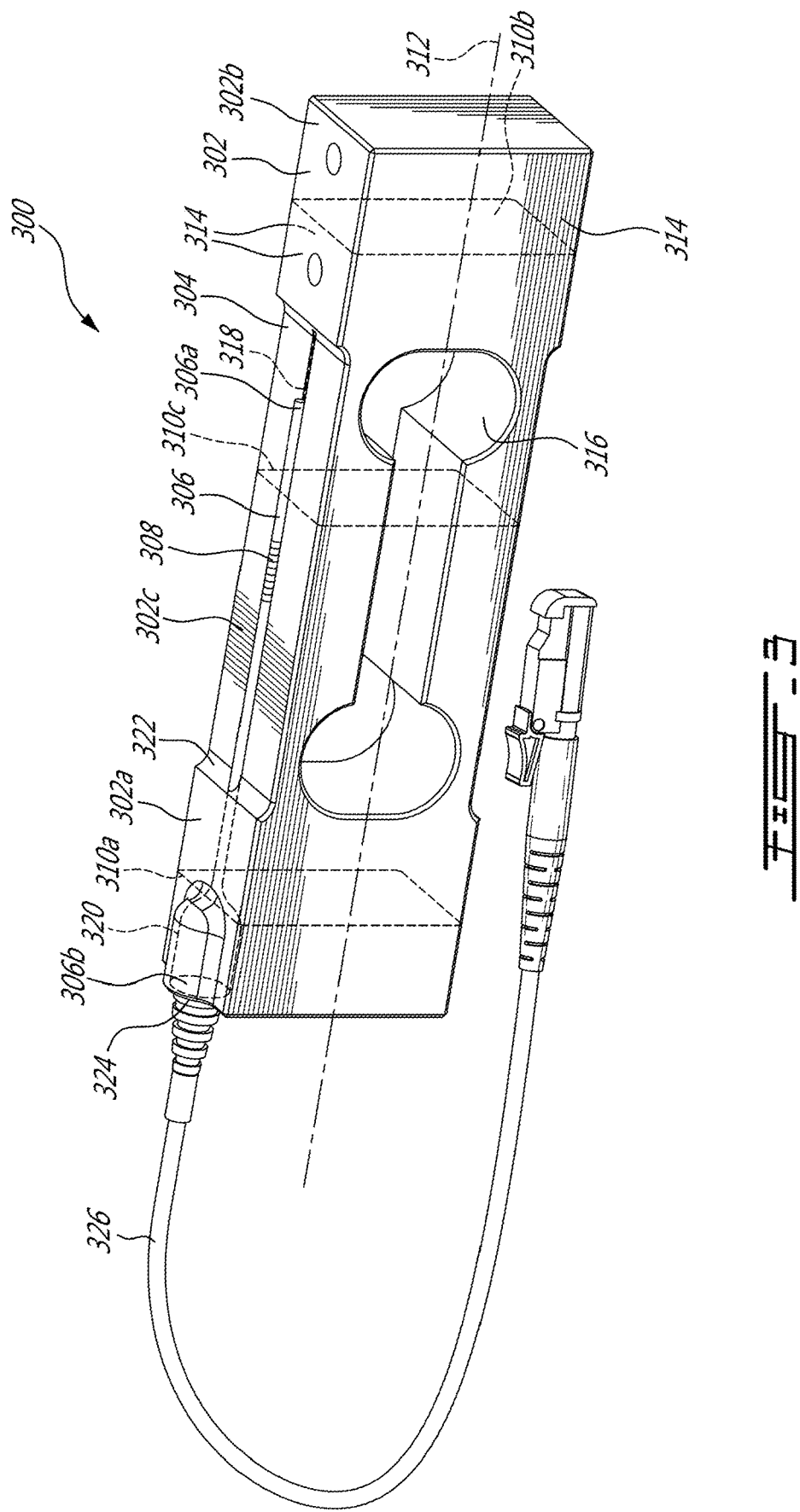
FIG. 3 is an oblique view of an example of an optical sensor for load sensing applications, with a sensing optical fiber disposed along a deformable member.

FIG. 3 shows an example of an optical sensor 300, in accordance with an embodiment. As will be understood, the optical sensor 300 can be advantageously used for load sensing applications. When used in an optical sensing system, the optical sensor 300 can be used for continuously determining and/or recording the direction, magnitude, and duration of the forces acting on the optical sensor 300.

As shown, the optical sensor 300 has a frame 302 having a deformable member 304 mounted to the frame 302. The optical sensor 300 has a sensing optical fiber 306 which is fixedly attached to a portion of the deformable member 304. The sensing optical fiber 306 has at least one π-phase-shifted fiber Bragg grating 308 inscribed thereon. Accordingly, the π-phase-shifted fiber Bragg grating 308 deforms together with the deformable member 304 when the frame 302 is subjected to a load. The deformation of the deformable member 304 can be monitored by monitoring the Bragg wavelength λB of the π-phase-shifted fiber Bragg grating 308.

The sensing optical fiber 306 can be a single-mode optical fiber such as the SMF-28. The π-phase-shifted fiber Bragg grating 308 is schematically illustrated for clarity purposes only. Indeed, in some embodiments, the π-phase-shifted fiber Bragg grating 308 can be inscribed along a shorter length (e.g., such as 2-4 mm) of the sensing optical fiber 306 whereas, in some other embodiments, the π-phase-shifted fiber Bragg grating 308 can be inscribed along longer lengths (e.g., 1-2 m) of the sensing optical fiber 306. The length along which the π-phase-shifted fiber Bragg grating 308 is inscribed generally depends on how the π-phase-shifted fiber Bragg grating 308 is attached to the deformable member 304.

In this example, the deformable member 304 is made integral to the frame 302. In alternate embodiments, however, the deformable member 304 can be separate from the frame 302, but mechanically coupled thereto.

In this example, the frame 302 is wholly made from a material that is deformable and elastic. In this case, only the deformable member 304 can be made of the deformable and elastic material. The material of the deformable member 304 is chosen so that the load applied on the frame 302 will not cause an plastic deformation of the deformable member 304. In other words, the extent to which the deformable member 304 is deformed is below an elastic limit of the material.

As shown, the frame 302 has a rectangular cross-section which extends along a length 312 of the frame 302, thus leaving the frame 302 with four lateral surfaces 314. In some other embodiments, however, it is understood that the frame 302 can have a circular cross-section, an ellipsoidal cross-section or any other suitable cross-sectional shape.

More specifically, in this example, the frame 302 has a first section 302a, an opposite second section 302b, and a middle section 302c between the first section 302a and the second section 302b. As shown, in this example, the middle section 302c of the frame 302 has a rectangular cross-section 310c that is slightly smaller than a rectangular cross-section 310a of the first section 302a and slightly smaller than a rectangular cross-section 310b of the second section 302b.

In addition, a recess 316 extending through the middle section 302c of the frame 302 is provided in this example. As can be understood, the middle section 302c of the frame 302 acts as the deformable member 304, which, in this example, will deform the sensing optical fiber 306 when the frame 302 is subjected to a load. The smaller rectangular cross-section 310c and the presence of the recess 316 of the deformable member 304 can focus the deformation at the middle section 302c and thus allow the deformable member 304 to be more deformed when the frame 302 is subjected to a load, leading to a greater shift in the Bragg wavelength $\lambda B$ of the π-phase-shifted fiber Bragg grating 308.

In this embodiment, the sensing optical fiber 306 extends along an axis 318 parallel to the length 312 of the frame 302. However, in some other embodiments, the sensing optical fiber 306 can be disposed in an arcuate path along one or more surfaces of the deformable member 304. In alternate embodiments, the sensing optical fiber 308 can be wrapped about the length 312 of the frame 302, and more specifically, around the deformable member 304.

The sensing optical fiber 306 can be attached to the deformable member 304 by any suitable means. For instance, the sensing optical fiber 306 can be adhered to the deformable member 304 via a suitable adhesive.

As depicted in this example, the frame 302 has a channel 320 recessed in the first section 302a of the frame 302 and leading to the deformable member 304 via a step 322 resulting from the difference between the rectangular cross-sections 310a and 310c. Accordingly, a first end 306a of the sensing optical fiber 306 can be inserted into the channel 320 and pushed along the channel 320 such that the first end 306a of the sensing optical fiber 306 nearly reaches the second section 302b of the frame 302. In this example, a second end 306b of the sensing optical fiber 306, opposite to the first end 306a, is provided with an optical connector 324 for connection to a patch cord 326.

The material of the deformable member 304, its modulus of elasticity, its yield strength and its coefficient of thermal expansion, its geometric properties such as its width, its height and its length thickness are known so that a particular deformation of the deformable member 304 determine and/or record the direction, magnitude, and duration of the forces acting on the optical sensor 300. Examples of materials that can be used for the deformable member 304 include stainless steel, Inconel, silicon carbide and the like. The length of the frame 302 can range between 20 mm and 400 mm and the width/height of the frame 302 can range between 1 mm and 50 mm, depending on the embodiment.

Figure 4:
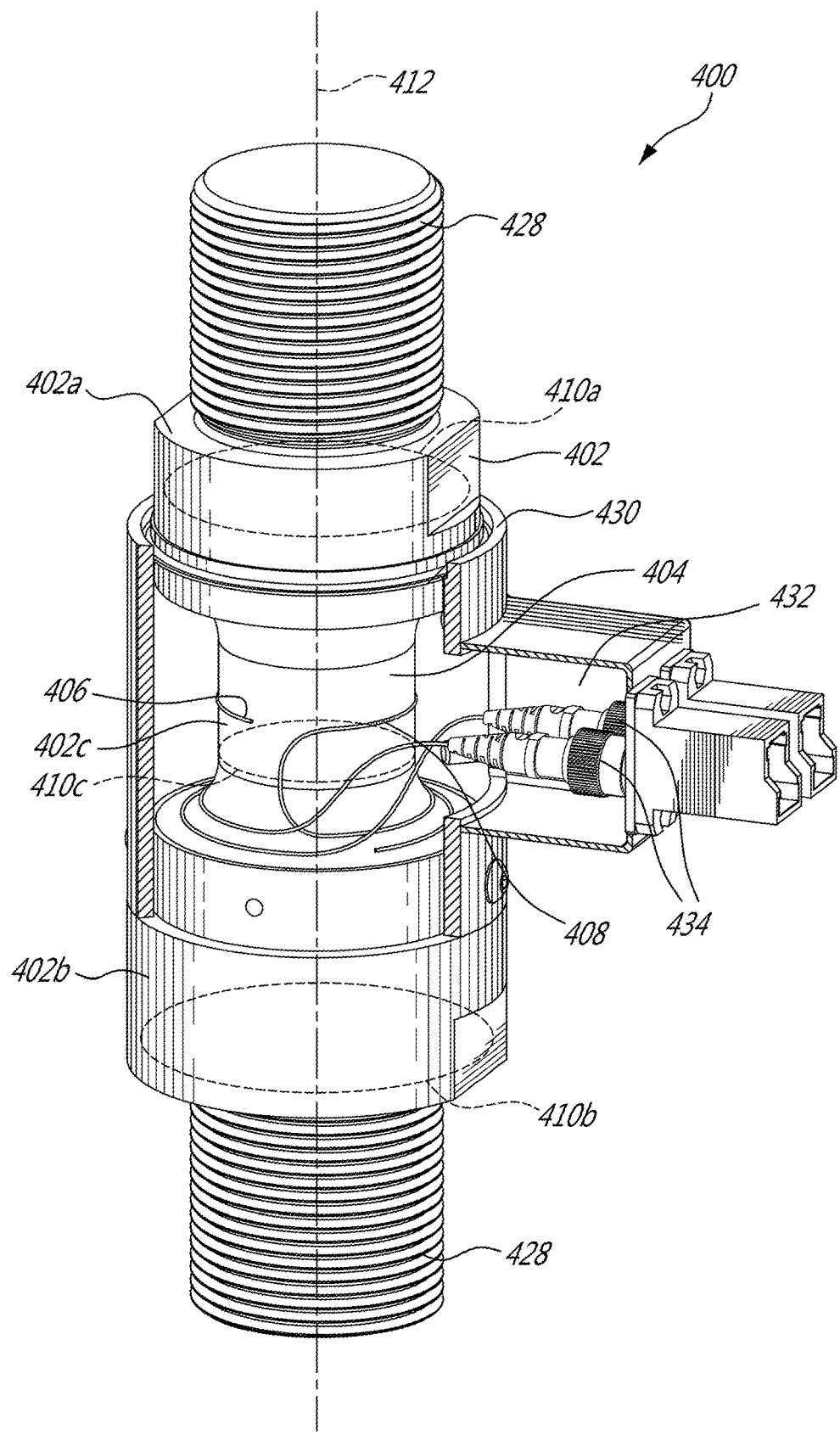
FIG. 4 is an oblique and cutaway view of another example of an optical sensor for load sensing applications, with a sensing optical fiber wrapped about a deformable member.

FIG. 4 shows another example of an optical sensor 400, in accordance with another embodiment. As will be understood, the optical sensor 400 can be advantageously used for load sensing applications. When used in an optical sensing system, the optical sensor 400 can be used for continuously determining and/or recording the direction, magnitude, and duration of the forces acting on the optical sensor 400. The optical sensor 400 has similarities with the optical sensor 300 described with reference to FIG. 3. Accordingly, similar elements will bear similar reference numerals, but in the 400-series instead of in the 300-series.

As depicted, the optical sensor 400 has a frame 402 having a deformable member 404 mounted to the frame 402. The optical sensor 400 has a sensing optical fiber 406 being fixedly attached to a portion of the deformable member 404. The sensing optical fiber has at least one π-phase-shifted fiber Bragg grating 408 inscribed thereon. The π-phase-shifted fiber Bragg grating 408 is schematically illustrated for clarity purposes only. Accordingly, π-phase-shifted fiber Bragg grating 408 deforms together with the deformable member 404 when the frame 402 is subjected to a load. The deformation of the deformable member 404 can be monitored by monitoring the Bragg wavelength $\lambda B$ of the π-phase-shifted fiber Bragg grating 408.

Still in this example, the deformable member 404 is made integral to the frame 402. Accordingly, in this example, the frame 402 is made from a deformable and elastic material as the one described above.

As illustrated, the deformable member 404 in this example has a circular cross-section which extends along a length 412 of the frame 402.

In this specific embodiment, the frame 402 has a first section 402a, an opposite second section 402b, and a middle section 402c between the first section 402a and the second section 402b. The first, second and middle portions 402a, 402b and 402c have a respective one of circular cross-sections 410a, 410b and 410c. As shown, the circular cross-section 410c of the middle section is smaller than the circular cross-sections 410a and 410b of the first and second sections 402a and 402b of the frame 402. The circular cross-section 410c acts as the deformation member 404, which will deform when the frame 402 is subjected to a load. Such a reduced circular cross-section 410c allows the deformable member 404 to be more deformed when the frame 402 is subjected to a force, leading to a greater shift in the Bragg wavelength $\lambda B$ of the π-phase-shifted fiber Bragg grating 408.

As shown in this embodiment, each of the first and second sections 402a and 402b of the frame 402 terminates in threads 428 for screwing in corresponding threaded holes (not shown).

As this embodiment, the sensing optical fiber 406 is wrapped about the circular cross-section 410c of the deformable member 404, and attached thereto. In another embodiment, the sensing optical fiber 406 can be attached to the deformable member 404 such that the sensing optical fiber 406 extends along an axis parallel to the length 412 of the frame 402. In both of these embodiments, the sensing optical fiber 406 can be adhered to the deformable member 404 via a suitable adhesive.

In this embodiment, the frame 402 includes a sleeve 430 which covers the middle a portion of the frame 402 and which is secured thereto. The sleeve 430 can be sealingly mounted to the frame 402. As shown, the sleeve 430 has a fiber opening 432 through which the sensing optical fiber 406 can be provided. The fiber opening 432 of the sleeve 430 can be provided with optical connectors 434 for connection to corresponding patch cords (not shown).

Figure 5:
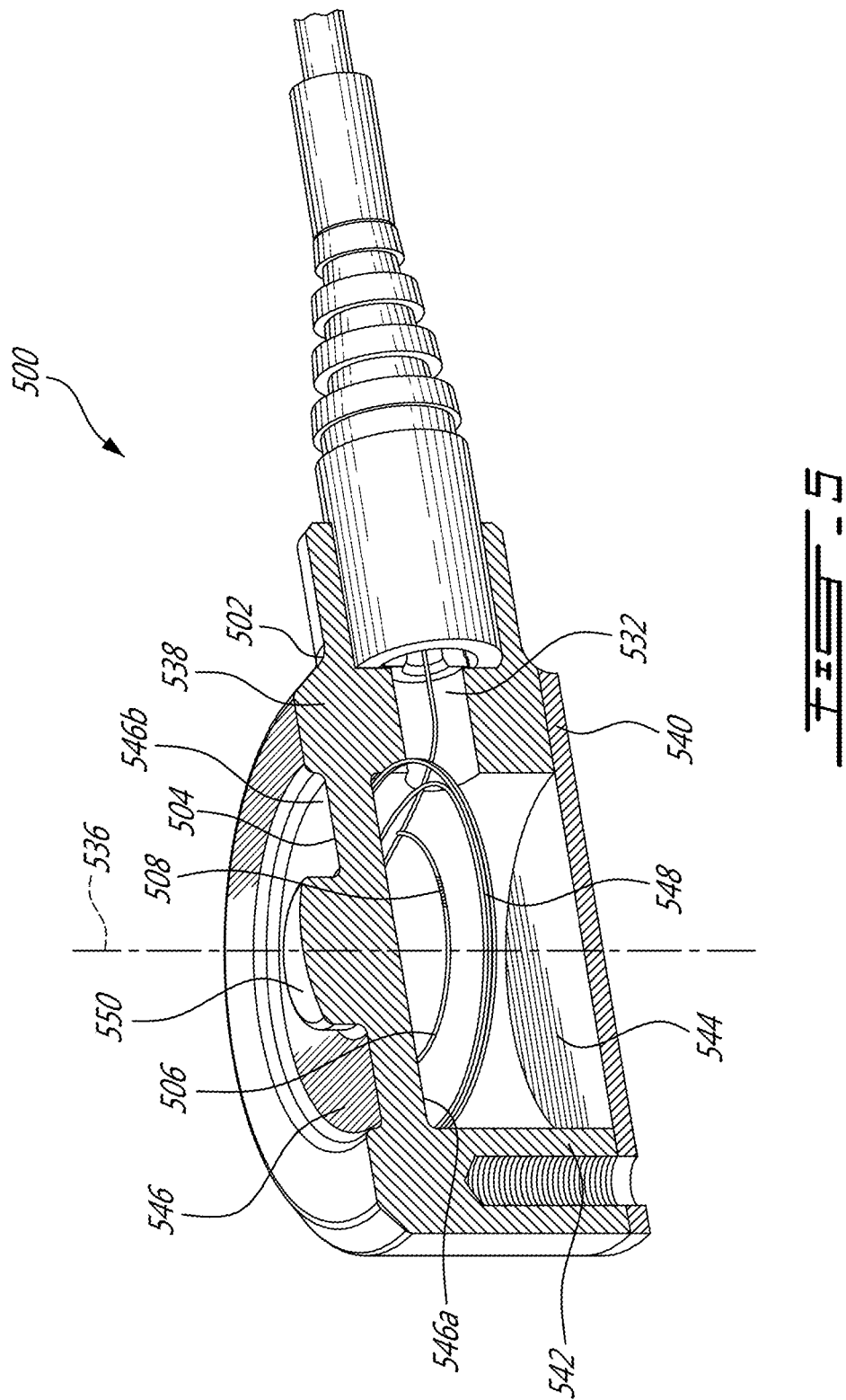
FIG. 5 is an oblique and cutaway view of another example of an optical sensor for load sensing applications, with a sensing optical fiber inside a housing of the optical sensor.

FIG. 5 shows another example of an optical sensor 500, in accordance with an embodiment. As will be understood, the optical sensor 500 can be advantageously used for load sensing applications, and more specifically, to a load applied along a sensing orientation 536. When used in an optical sensing system, the optical sensor 500 can be used for continuously determining and/or recording the direction, magnitude, and duration of the forces acting on the optical sensor 500. The optical sensor 500 has similarities with the optical sensors 400 described with reference to FIG. 4. Accordingly, similar elements will bear similar reference numerals, but in the 500-series instead of in the 400-series.

As illustrated, the optical sensor 500 has a frame 502 having a deformable member 504 mounted to the frame. The optical sensor 500 has a sensing optical fiber 506 which is fixedly attached to a portion of the deformable member 504. The sensing optical fiber 506 has at least one π-phase-shifted fiber Bragg grating 508 inscribed thereon. The π-phase-shifted fiber Bragg grating 508 is schematically illustrated for clarity purposes only. Accordingly, the π-phase-shifted fiber Bragg grating 508 deforms together with the deformable member 504 when the frame 502 is subjected to a load along the sensing orientation 536. The deformation of the deformable member 504 can be monitored by monitoring the Bragg wavelength λB of the π-phase-shifted fiber Bragg grating 508.

In this example, the frame 502 is provided in the form of a housing 538 having a base 540 perpendicular to the sensing orientation 536. The housing 538 also has a cylindrical wall 542 which extends along the sensing orientation 536 and which defines a cavity 544. The housing 538 also has a fiber opening 532 for letting the sensing optical fiber 506 reach the cavity 544. As shown, the cylindrical wall 542 terminates in a diaphragm 546 which acts as the deformable member 504. The cylindrical wall 542 need not be cylindrical, as it can have any other shape in other embodiments.

The material of the diaphragm 546, its modulus of elasticity, its yield strength and its coefficient of thermal expansion, its geometric properties, such as its thickness and diameter, are known so that a particular deformation of the diaphragm 546 can be used to determine and/or record the direction, magnitude, and duration of the forces acting on the optical sensor 500. Examples of materials that can be used for the diaphragm 546 include stainless steel, Inconel, silicon carbide and the like. The diameter of the diaphragm 546 can range between 15 mm and 40 mm whereas its thickness can range between 0.1 mm and 2 mm. In this embodiment, the diaphragm 546 is made integral to the housing 538. However, in some other embodiments, the diaphragm 546 can be provided as a separate part which is sealingly attached to the cylindrical wall 542. The diaphragm 546 is configured to deform similarly in both directions of the sensing orientation 536.

As shown, the sensing optical fiber 506 lies inside the cavity 544 of the housing 538. The sensing optical fiber 506 can be inserted through the housing 538 via the fiber opening 532 of the housing 538.

The sensing optical fiber 506 is attached to an interior surface 546a of the diaphragm 546. Indeed, in this example, the sensing optical fiber 506 is wrapped into a roll 548 of sensing optical fiber 506, which is then attached to the interior surface 546a of the diaphragm 546. For instance, the roll 548 of sensing optical fiber 506 can be adhered to the interior surface 546a.

As shown, the diaphragm 546 has a load receiving protrusion 550 which is disposed on an exterior surface 546b of the diaphragm 546. The roll 548 of sensing optical fiber 506 is concentrically disposed around the load receiving protrusion 550. Forces applied perpendicular to the sensing orientation 536 are isolated in the design of the housing 538 so that the optical sensor 500 can operate as a uniaxial load cell.

When attached in such an arrangement, the sensing optical fiber 506 measures the tangential deformation of the diaphragm 546 in response to a force applied at the load receiving protrusion 550. This arrangement allows for a uniform deformation to be experienced by the sensing optical fiber 506 along its sensitive length.

Figure 6:
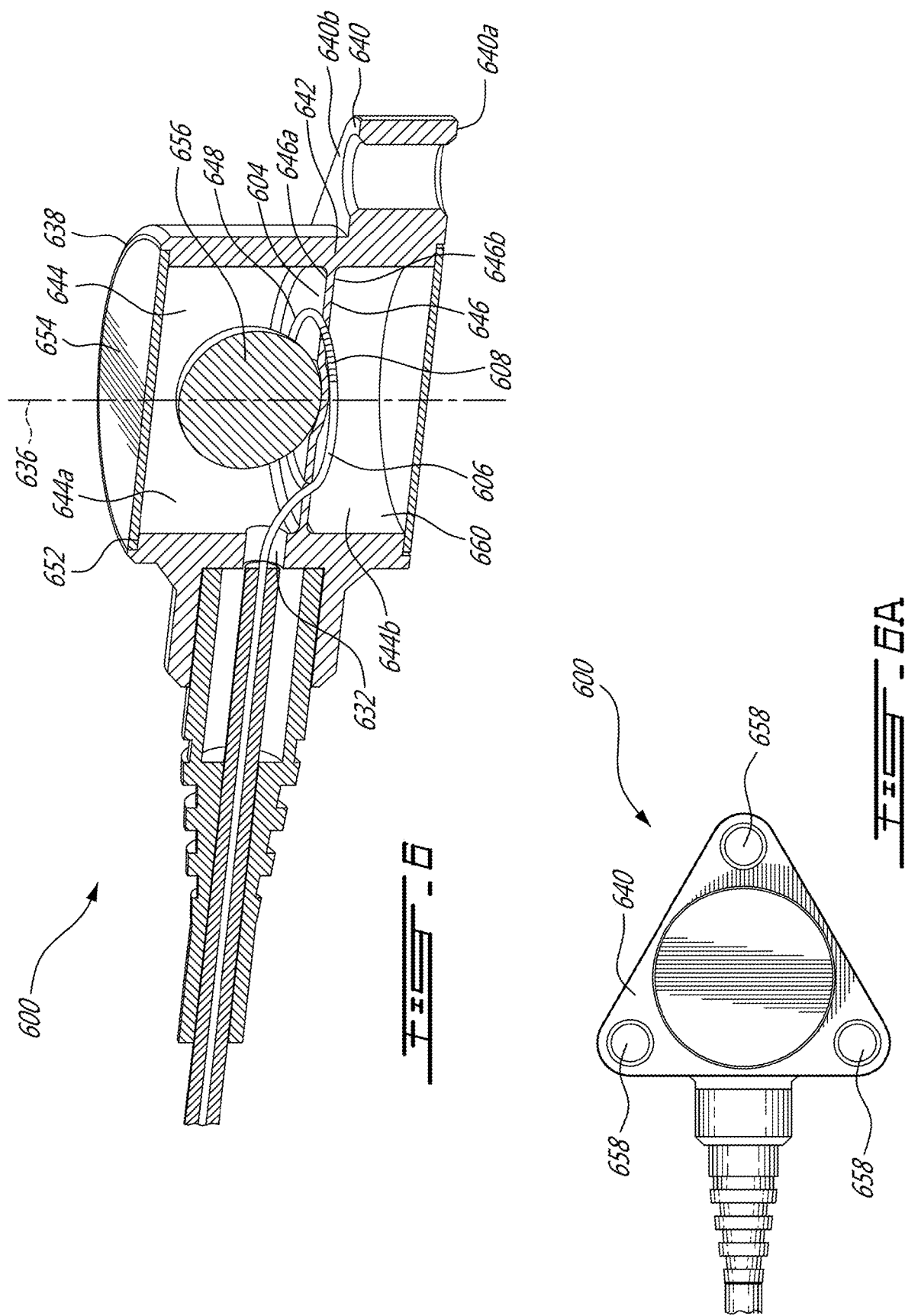
FIG. 6 is an oblique and cutaway view of an example of an optical sensor for motion sensing applications, with an inertia member disposed on a diaphragm of the optical sensor.

FIG. 6 shows another example of an optical sensor 600, in accordance with another embodiment. As will be understood, the optical sensor 600 can be advantageously used for motion sensing applications, and more specifically, for motion sensing occurring along a sensing orientation 636. When used in an optical sensing system, the optical sensor 600 can be used for continuously determining and/or recording the direction, magnitude, and duration of the forces acting to change the motion of the optical sensor 600. For instance, the optical sensor 600 is designed to be sensitive to acceleration along either or both directions of the sensing orientation 636. The optical sensor 600 has similarities with the optical sensors 500 described with reference to FIG. 5. Accordingly, similar elements will bear similar reference numerals, but in the 600-series instead of in the 500-series.

As shown, the optical sensor 600 has a housing 638 having a deformable member 604 mounted to the housing 638. The optical sensor 600 has a sensing optical fiber 606 being fixedly attached to a portion of the deformable member 604. The sensing optical fiber 606 has at least one π-phase-shifted fiber Bragg grating 608 inscribed thereon. Accordingly, the π-phase-shifted fiber Bragg grating 608 deforms together with the deformable member 604 when the housing 638 is moved. The deformation of the deformable member 604 can be monitored by monitoring the Bragg wavelength λB of the π-phase-shifted fiber Bragg grating 608.

More specifically, in this example, the housing has a base 640 which is securable to an object and/or a structure of interest (not shown). As depicted, the base 640 is perpendicular to the sensing orientation 636. Accordingly, when the base of the housing is secured to the object and/or structure of interest, the optical sensor is configured and adapted to sense movement of the object and/or structure of interest occurring along the sensing orientation 636.

The housing 638 also has a cylindrical wall 642 extending along the sensing orientation 636 and which defines a cavity 644. The housing 638 also has a fiber opening 632 for letting the sensing optical fiber 606 reach the cavity 644. As shown, the fiber opening 632 is provided in the cylindrical wall 642 of the housing 638. In this embodiment, the cylindrical wall 642 terminates in an annular seat 652 for receiving a lid 654 which can be sealingly securable to the annular seat 652.

In this embodiment, the deformable member 604 includes a diaphragm 646 which is mounted to the cylindrical wall 642 of the housing 638. As shown, the diaphragm 646 extends in a plane which is perpendicular to the sensing orientation 636, and divides the cavity 644 into two sub cavities 644a and 644b.

The material of the diaphragm 646, its modulus of elasticity, its yield strength and its coefficient of thermal expansion, its geometric properties, such as its thickness and diameter, are known so that a particular deformation of the diaphragm 646 can be used to determine the acceleration of the optical sensor 600. Examples of materials that can be used for the diaphragm 646 include stainless steel, Inconel, silicon carbide and the like. In some embodiments, the diameter of the diaphragm 646 can range between 15 mm and 40 mm whereas its thickness can range between 0.1 mm and 2 mm, for instance. As shown, the diaphragm 646 is made integral to the housing 638. However, the diaphragm 646 can be a separate component from the housing 638 in some other embodiments. The diaphragm 646 is configured to deform similarly in both directions of the sensing orientation 636.

The optical sensor 600 has an inertial member 656 mechanically coupled to the diaphragm 646, and more specifically, to a first face 646a of the diaphragm 646. In this way, the sensing optical fiber 606 can experience the same deformation as the diaphragm 646. In this embodiment, the inertial member 656 is provided in the form of a ball which is centered with respect to the diaphragm 646. As will be understood, the use of the inertial member 656 helps in amplifying the deformation of the diaphragm 646, as the optical sensor 600 is moved in the sensing orientation 636. The cavity 644 is sized and shaped to let the inertial member 656 freely deform the diaphragm 646 as the optical sensor 600 is moved. In this example, the inertial member 656 can be provided in the form of a tungsten carbine ball, as it can have known geometric properties and a relatively high density, which allows for a more compact optical sensor. The inertial member 656 can have any suitable shape. However, it is preferred that the center of mass of the inertial member 656 be positioned concentrically with the diaphragm 646. The inertial member 656 can have a mass ranging between 5 g and 30 g in some embodiments.

In view of the construction of the housing, the optical sensor 600 is configured to be sensitive to a particular direction of change in motion along the sensing orientation 636. In this embodiment, changes in motion which are perpendicular to the sensing orientation 636 are isolated so that the optical sensor 600 can operate as a uniaxial accelerometer.

The inertial member 656 can react to an applied force acting to change the motion of the optical sensor 600 relative to a fixed reference plane by applying a corresponding force to the diaphragm 646 proportional to the product of the mass of the inertial member 656 and its acceleration relative to the fixed reference plane. When this force is applied to the diaphragm 646, a deformation of the material of the diaphragm 646 occurs proportionally to the geometric and material properties of the diaphragm 646.

In this embodiment, the housing 638 can be used to provide environmental isolation to the diaphragm 646, the inertial member 656 and to the sensing optical fiber 606 so as to minimize any applied inputs which are not of interest. For instance, the housing 638 provides protection from a user touching the inertial member 656 during operation thereby altering the deformation of the diaphragm 646.

As can be seen, the sensing optical fiber 606 is wrapped into a roll 648 of sensing optical fiber 606, and attached to the first face 646a of the diaphragm 646. As shown, the roll 648 of sensing optical fiber 606 is concentrically positioned with respect to the inertial member 656. In this example, the roll 648 has a diameter ranging between 8 mm and 20 mm, preferably 12 mm, but the roll 648 can have any other suitable diameter. When attached in such an arrangement, the sensing optical fiber 606 measures the tangential deformation of the diaphragm 646 in response to a force applied at the center of the diaphragm 646 (by the inertial member 656). This arrangement allows for uniform deformation to be experienced by the sensing optical fiber 606 along its sensitive length. In some other embodiments, the sensing optical fiber 606 can be arranged in a straight line extending radially on the diaphragm 646, with a midpoint of its sensitive length positioned at the center of the diaphragm 646. In this arrangement, the sensing optical fiber 606 can be attached to a second face 646b of the diaphragm 646. This latter arrangement can be best suited for sensing optical fiber 606 having a short sensitive length, e.g., 4 mm.

In this specific embodiment, the base 640 has a first surface 640a which is to be abutted on and secured to the object and/or structure of interest, and an opposite second surface 640b. The base 640 can have a first thickness corresponding to the spacing distance between the first and second surfaces 640a and 640b.

The base can be secured to the object and/or structure of interest with any suitable type of fastener and/or adhesive. As best seen in FIG. 6A, the base 640 has three bores 658 in this example. Each of the bores 658 extend through the base 640, from the first surface 640a to the second surface 640b. However, it will be understood that the base 640 can have one bore, two more or more than three bores depending on the embodiment. The base 640 needs not have bores, as the first surface 640a can be adhered to the object and/or structure of interest in alternate embodiments. It is intended that the housing 638 can be secured to any location where a measurement of acceleration is of interest.

The cylindrical wall 642 of the housing 638 extends from the second surface 640b, away therefrom, and along the sensing orientation 636. In this example, the cavity 644 has a circular cross-section. As shown, the base 640 has a recessed portion 660 recessing from the second surface 640b of the base towards the first surface 640a. In this example, the recessed portion 660 of the base prolongs the cavity 644 towards the first surface 640a. The resulting cavity is thus formed by the cylindrical wall 642 and the recessed portion 660 of the base 640.

Figure 7:
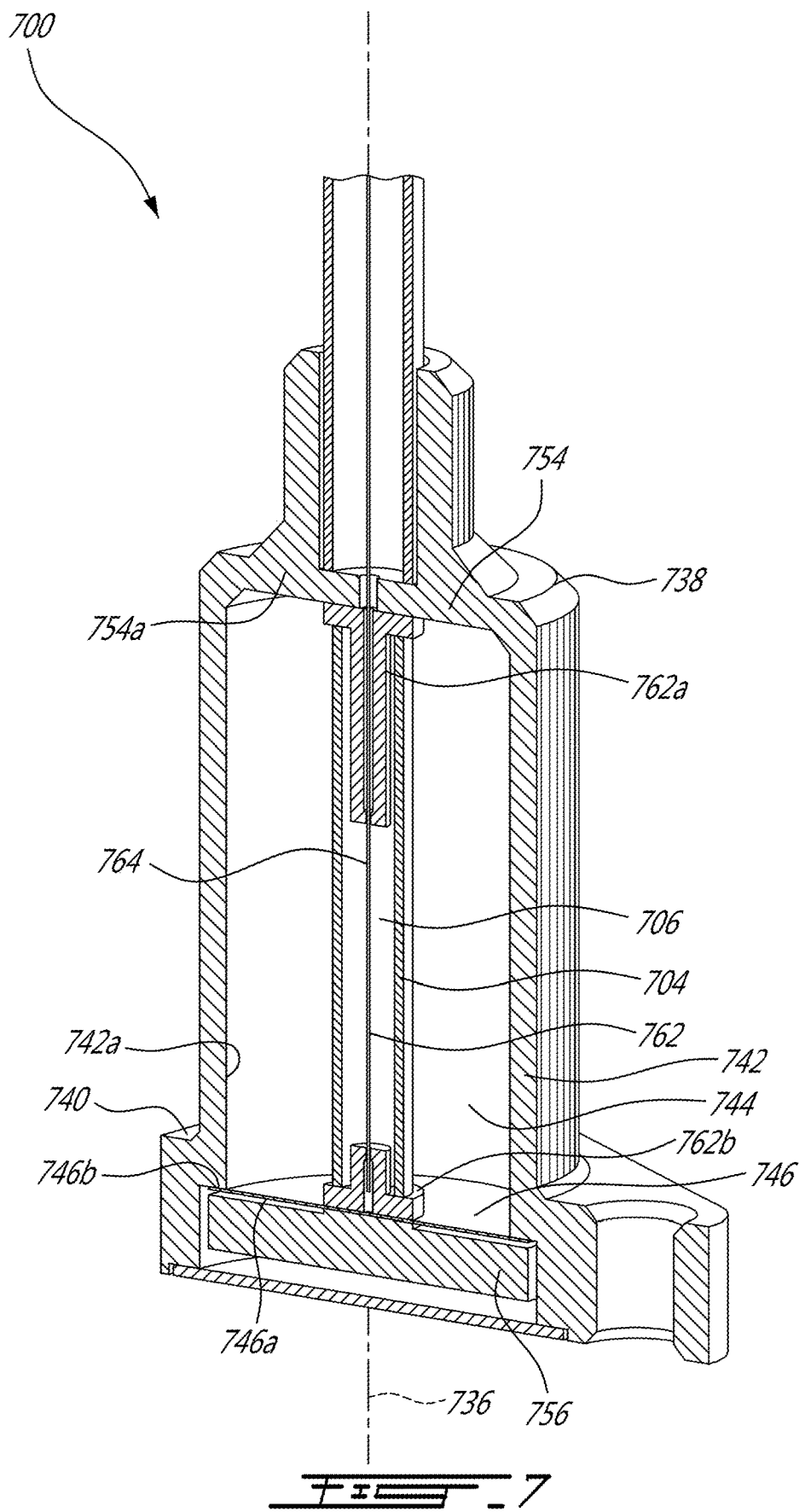
FIG. 7 is an oblique and cutaway view of another example of an optical sensor for motion sensing applications, with an inertia member mounted to a deformable tubular member.

FIG. 7 shows another example of an optical sensor 700, in accordance with another embodiment. As will be understood, the optical sensor 700 can be advantageously used for motion sensing applications, and more specifically for motion sensing occurring along a sensing orientation 736. When used in an optical sensing system, the optical sensor 700 can be used for continuously determining and/or recording the direction, magnitude, and duration of the forces acting to change the motion of the optical sensor 700. For instance, the optical sensor is designed to be sensitive to acceleration along either or both directions of the sensing orientation 736.

As shown, the optical sensor has a housing 738 having a deformable member 704 mounted to the housing 738. The optical sensor 700 has a sensing optical fiber 706 being fixedly attached to a portion of the deformable member 704. The sensing optical fiber 706 has at least one π-phase-shifted fiber Bragg grating inscribed thereon. Accordingly, π-phase-shifted fiber Bragg grating of the sensing optical fiber 706 deforms together with the deformable member 704 when the housing 738 is moved. The deformation of the deformable member 704 can be monitored by monitoring the Bragg wavelength λB of the πphase-shifted fiber Bragg grating.

More specifically, in this example, the housing 738 has a base 740 which is perpendicular to the sensing orientation 736. The base is securable to an object and/or a structure of interest. Accordingly, when the base 740 of the housing 738 is secured to the object and/or structure of interest, the optical sensor 700 is configured and adapted to sense movement of the object and/or structure of interest occurring along the sensing orientation 736.

The housing 738 also has a cylindrical wall 742 extending along the sensing orientation 736 and which defines a cavity 744. In this embodiment, a lid 754 seals the cavity 744 atop the cylindrical wall 742. As shown, the lid 754 is made integral to the cylindrical wall 742 in this embodiment. However, the lid 754 can be a separate part which is secured to the cylindrical wall 742. The housing 738 also has a fiber opening 732 in the lid 754 for letting the sensing optical fiber 706 reach the cavity 744. As shown, the fiber opening is concentrically positioned with respect to the lid 754.

In this specific example, the deformable member 704 includes a deformable tubular member 762 which extends along the sensing orientation 736, inside the cavity 744. The deformable tubular member 762 has a first extremity 762a mounted to an inside face 754a of the lid 754 and a second extremity 762b mounted to base 740. As shown, the sensing optical fiber 706 is attached (e.g., adhered) to an interior surface 764 of the deformable tubular member 762 along the sensing orientation 736. Accordingly, the deformation experienced by the tubular member 762 in tension or compression is equal to that of the sensing optical fiber 706.

The material of the deformable tubular member 762, its modulus of elasticity, its yield strength and its coefficient of thermal expansion, its geometric properties, such as its thickness and diameter, are known so that a particular deformation of the deformable tubular member 762 can be used to determine the acceleration of the optical sensor 700. Examples of materials that can be used for the deformable tubular member 762 include stainless steel, Inconel, silicon carbide and the like.

The optical sensor 700 has an inertial member 756 which is mechanically coupled to the deformable tubular member 762 in this embodiment. More specifically, the inertial member 756 is mounted to the second extremity 762b of the deformable tubular member 762. The use of the inertial member 756 can help in amplifying the deformation of the deformable tubular member 762 as the optical sensor 700 is moved in the sensing orientation 736. Accordingly, when the inertial member 756 experiences a change in motion, the force applied in tension or compression to the inertial member 756 is proportional to the mass of the inertial member 756 and the acceleration of the inertial member 756 relative to a fixed reference point.

The optical sensor 700 has a characteristic sensitivity to the applied change in motion, which is determined by the geometric and material properties of the deformable tubular member 762 and the mass of the inertial member 756. By altering the geometric and material properties of the deformable tubular member 762 to have a lower spring constant, the optical sensor 700 becomes more sensitive and vice versa. By lowering the mass of the inertial member 756, the optical sensor 700 becomes less sensitive and vice versa.

The optical sensor 700 as described has a characteristic natural resonant frequency of the deformable tubular member 762 and inertial member 756. When an oscillating change of motion (e.g., vibration) is applied to the housing 738 of a varying frequency, the natural resonant frequency may be reached, which would, thereby, alter the characteristic sensitivity of the optical sensor 700. Therefore, the characteristic natural resonant frequency of the optical sensor 700 is preferably known and designated specifically to suit the operating conditions of the optical sensor 700. Such a natural resonant frequency is inversely proportional to the sensitivity of the optical sensor 700, by which, the more sensitive the optical sensor 700 to changes in motion, the lower the natural resonant frequency of the optical sensor 700. The optical sensor 700; therefore, takes advantage of the high sensitivity of the sensing optical fiber 706 and associated optical sensing system to apply deformation in order for the sensitivity and the natural resonant frequency to be chosen suitable for a wide range of operating conditions.

In this specific embodiment, the deformable member 704 further has a diaphragm 746 which has a perimeter mounted to an interior surface 742a of the cylindrical wall 742. Further, the diaphragm 746 has a first face 746a mounted to the inertia member 756 and a second face 746b mounted to the second extremity 762b of the deformable tubular member 762. Accordingly, the presence of the diaphragm 746 in this example can limit the amplitude of the deformation of the deformable tubular member 762.

Figure 8:
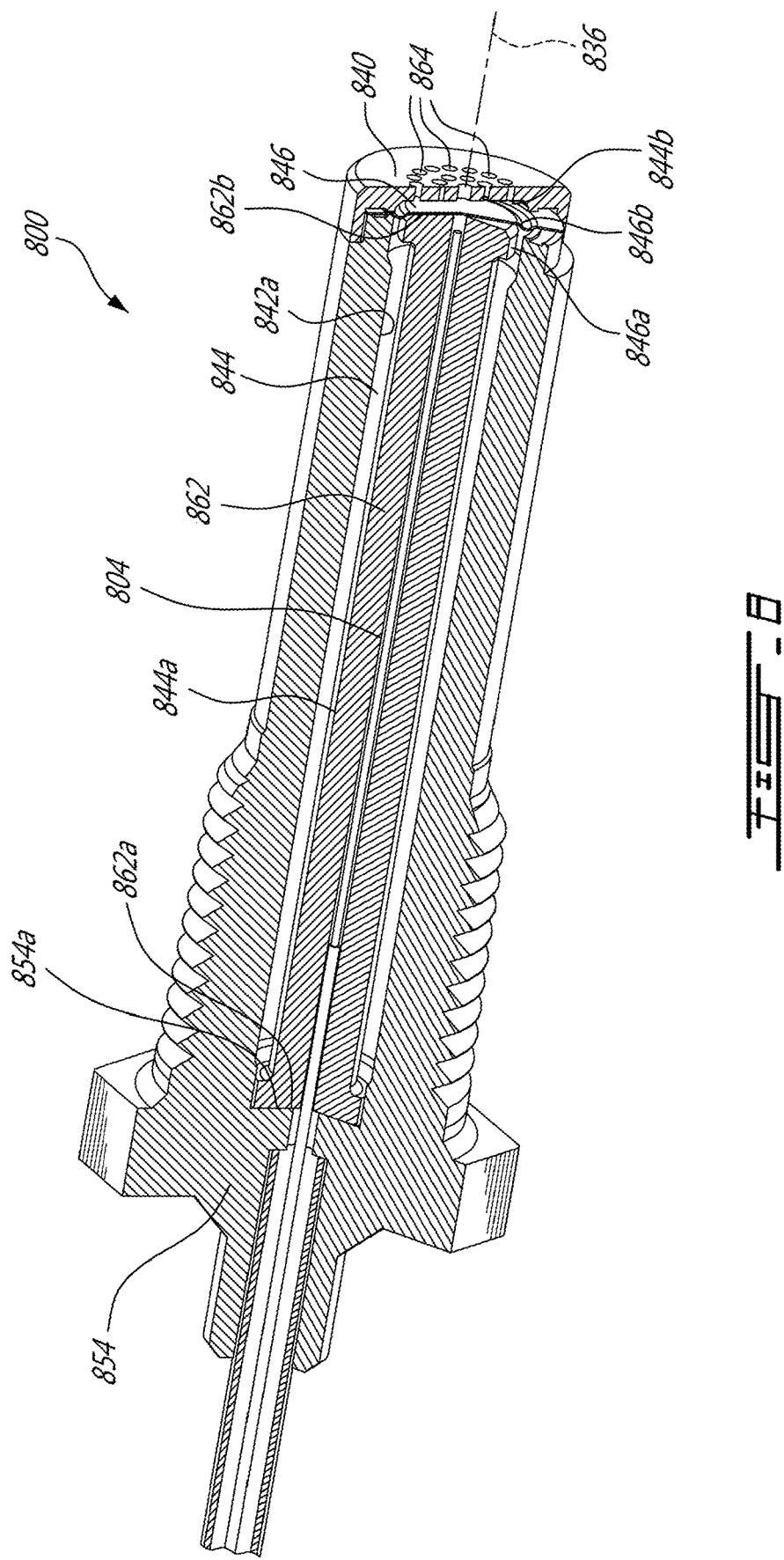
FIG. 8 is an oblique and cutaway view of an example of an optical sensor for pressure sensing applications, in a deformable tubular member and diaphragm configuration.

FIG. 8 shows another example of an optical sensor 800, in accordance with another embodiment. As will be understood, the optical sensor 800 can be advantageously used for pressure sensing applications. When used in an optical sensing system, the optical sensor 800 can be used for continuously determining and/or recording the direction, magnitude, and duration of the pressure of a fluid (liquid and/or gas) acting on the optical sensor 800. The optical sensor 800 is similar to the optical sensor 700, except that the inertial member 756 is omitted and that the base 740 has a through apertures. Accordingly, similar elements will bear similar reference numerals, but in the 800-series instead of in the 700-series.

In this specific example, the deformable member 804 includes a deformable tubular member 862 and a diaphragm 846. More specifically, the deformable tubular member 862 extends along a sensing orientation 836, inside a cavity 844 and has a first extremity 862a mounted to an inside face 854a of a lid 854 and a second extremity 862b mounted to the diaphragm 846. As shown, the diaphragm 846 has a perimeter mounted to the interior surface 842a of the cylindrical wall 842. The diaphragm 846 thus divides the cavity 844 into two sub cavities 844a and 844b (e.g., a "dry side" and a "wet side"). As can be seen, the diaphragm 846 has a first face 846a exposed to the sub cavity 844b and a second face 846b mounted to the inertia member 856.

As will be understood, the first face 846a of the diaphragm 846 is exposed to the environment via through apertures 864 recessed in a base 840. The base 840 and the through apertures 864 can be collectively referred to as a pressure port of the optical sensor 800. Pressure of the environment can thus be sensed via the deformation of the deformable tubular member 862, which results from a pressure of the environment exerted on the diaphragm 846.

The materials of the deformable tubular member 862 and of the diaphragm 846, their modulus of elasticity, their yield strengths and their coefficients of thermal expansion, their geometric properties, such as their thicknesses and diameters, are known so that a particular deformation of the deformable tubular member 862 and of the diaphragm 846 can be used to determine and/or record the direction, magnitude, and duration of the pressure of the optical sensor 800. Examples of materials that can be used for the deformable tubular member 862 include stainless steel, Inconel, silicon carbide and the like. The diaphragm 846 can have a thickness ranging between 0.1 mm and 5 mm and have a diameter ranging between 15 mm and 50 mm.

Figure 9:
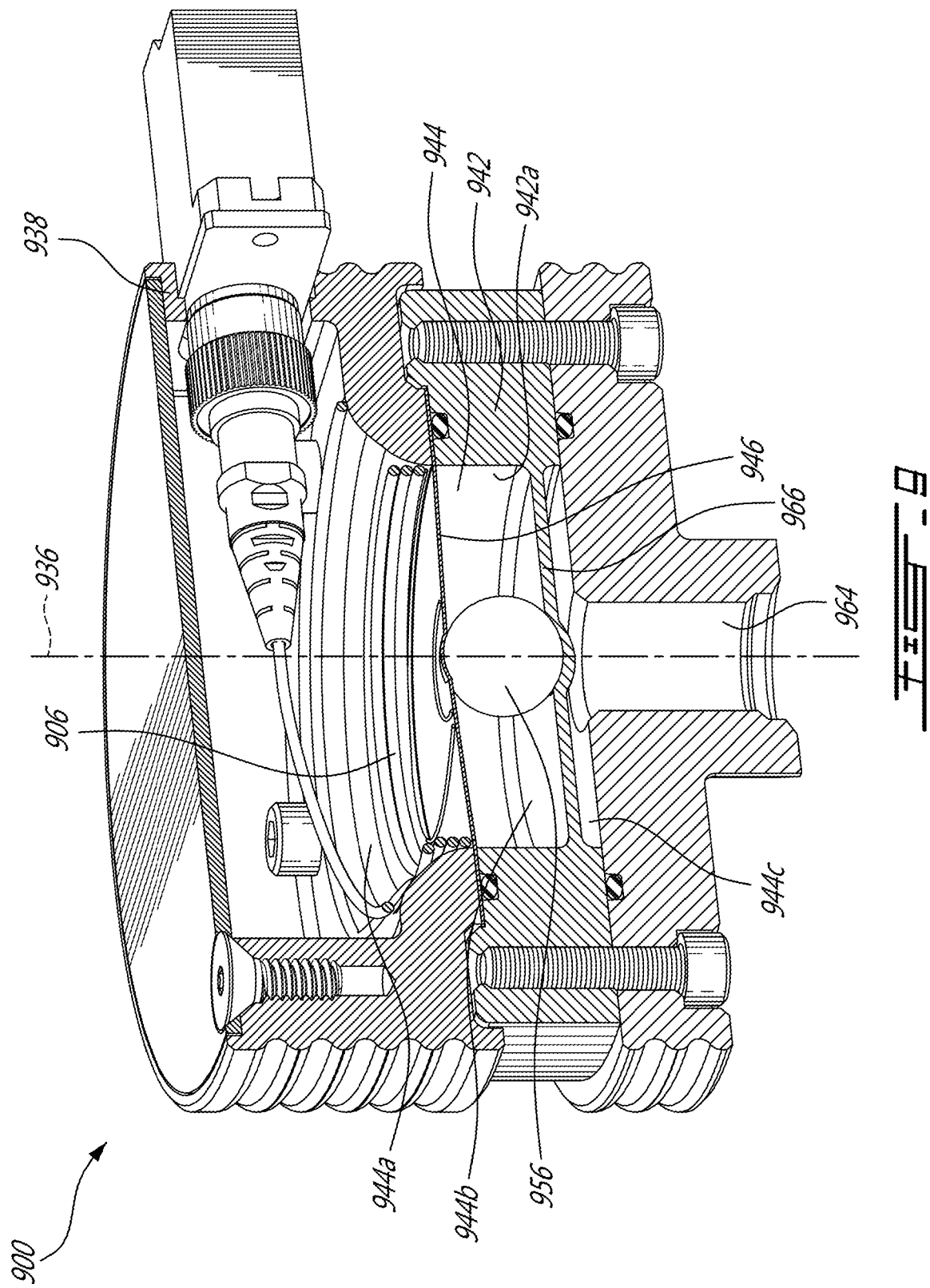
FIG. 9 is an oblique and cutaway view of another example of an optical sensor for pressure sensing applications, in a dual diaphragm configuration.

FIG. 9 shows another example of an optical sensor 900, in accordance with another embodiment. As will be understood, the optical sensor 900 can be advantageously used for pressure sensing applications. The optical sensor 900 is similar to the optical sensor 600, except for a few differences. Similar elements will bear similar reference numerals, but in the 900-series instead of in the 600-series.

As shown, the housing 938 has a first diaphragm 946 and a second diaphragm 966 mounted to the interior surface 942a of the cylindrical wall 942. In this example, the first and second diaphragms 946 and 966 are parallel to one another and spaced apart from one another along the sensing orientation 936. The first and second diaphragms 946 and 966 divide the cavity into three sub cavities: a first sub cavity 944a, a second sub cavity 944b and a third sub cavity 944c.

As depicted, the sensing optical fiber 906 lies in the first sub cavity 944a and is attached to the first diaphragm 946. A mechanic coupler 970 lies in the second sub cavity 944b and is mechanically coupled to both the first and second diaphragms 946 and 966. The third sub cavity 944c is exposed to the environment via one through aperture 964 recessed in the base 940 of the housing 938. As will be understood, the second diaphragm 966 is exposed to the environment via the through aperture 964. Accordingly, the pressure of the environment can be sensed via the deformation the second diaphragm 966, which is transmitted and amplified to the first diaphragm 946 and to the sensing optical fiber 906 via the mechanic coupler 970.

As can be understood, the examples described above and illustrated are intended to be exemplary only. For instance, the configurations of the deformable member described herein are exemplary only. Other configurations of the deformable member can maintain the functionality of the optical sensor to successfully translate applied forces to a deformation at the sensing optical fiber and thereby communicate or record the applied force. In alternate embodiments, the sensing optical fiber can have a plurality of π-phase-shifted fiber Bragg gratings. With an optical source operating at a different wavelengths (or frequencies), multiple Bragg wavelength shifts can be monitored on a same sensing optical fiber. The reflections of these π-phase-shifted fiber Bragg gratings can be demultiplexed based on the lasers wavelengths and can be sent back to the signal conditioner to modulate the appropriate laser. The scope is indicated by the appended claims.

What is claimed is:

1. An optical sensor comprising a frame having a deformable member mounted to the frame, and a sensing optical fiber being fixedly attached to a portion of the deformable member, the sensing optical fiber having at least one πphase-shifted fiber Bragg grating inscribed thereon, the at least one πphase-shifted fiber Bragg grating being birefringence-free and having a filter function exhibiting a single resonance peak, the at least one πphase-shifted fiber Bragg grating of the sensing optical fiber deforming together with the deformable member when the frame is subjected to a force.

2. The optical sensor of claim 1 wherein the frame is provided in the form of a housing defining a cavity, and having a base perpendicular to a sensing orientation and a fiber opening, the deformable member being mounted to the housing, the sensing optical fiber lying inside the cavity via the fiber opening of the housing.

3. The optical sensor of claim 2 wherein the deformable member includes a diaphragm mounted inside the housing, extending in a plane perpendicular to the sensing orientation.

4. The optical sensor of claim 3 further comprising an inertial member mechanically coupled to the diaphragm, the cavity being sized and shape to let the inertial member freely move when the housing is subjected to the force.

5. The optical sensor of claim 4 wherein the sensing optical fiber is wrapped into a roll of optical fiber, the roll of optical fiber being attached to a face of the diaphragm and being concentrically positioned with the inertial member.

6. The optical sensor of claim 4 wherein the diaphragm is a first diaphragm, the deformable member including a second diaphragm mounted inside the housing and extending in a plane parallel and spaced from a plane of the first diaphragm, the first and second diaphragms dividing the cavity into at least two sub cavities, the housing further comprising at least one through opening exposing one of the at least two sub cavities, the sensing optical fiber lying in another one of the at least two sub cavities.

7. The optical sensor of claim 2 wherein the deformable member includes a deformable tubular member mounted inside the housing and extending along the sensing orientation between two extremities of the deformable tubular member, the sensing optical fiber being attached to an interior surface of the deformable tubular member.

8. The optical sensor of claim 6 further comprising an inertial member mechanically coupled to a first extremity of the deformable tubular frame, the cavity being sized and shaped to let the inertial member freely move when the housing is subjected to the force.

9. The optical sensor of claim 8 wherein the deformable member further comprises a diaphragm mounted inside the housing and to a second extremity of the deformable tubular member, dividing the cavity into at least two sub cavities, the sensing optical fiber lying in one of the at least two sub cavities, the housing having at least one through aperture in another one of the at least two sub cavities.

10. The optical sensor of claim 1 wherein the deformable member is made integral to the frame.

11. An optical sensing system comprising:
an optical sensor
a frame having a deformable member mounted to the frame, and
a sensing optical fiber being fixedly attached to a portion of the deformable member, the sensing optical fiber having at least one πphase-shifted fiber Bragg grating inscribed thereon, the at least one πphase-shifted fiber Bragg grating being birefringence-free and having a filter function exhibiting a single resonance peak, the at least one πphase-shifted fiber Bragg grating of the sensing optical fiber deforming together with the deformable member when the frame is subjected to a force; and
a signal conditioner optically coupled to the sensing optical fiber, the signal conditioner being adapted and configured to measure a Bragg wavelength shift $\Delta\lambda B$ of the πphase-shifted fiber Bragg grating and to generate a signal representative of the Bragg wavelength shift $\Delta\lambda B$; and
a computer communicatively coupled to the signal conditioner and being configured to sense a measurand of interest based on the Bragg wavelength shift $\Delta\lambda B$ and on known properties of the optical sensor.

12. The optical sensing system of claim 11 wherein the frame is provided in the form of a housing defining a cavity, and having a base perpendicular to a sensing orientation and a fiber opening, the deformable member being mounted to the housing, the sensing optical fiber lying inside the cavity via the fiber opening of the housing.

13. The optical sensing system of claim 12 wherein the deformable member includes a diaphragm mounted inside the housing, extending in a plane perpendicular to the sensing orientation.

14. The optical sensing system of claim 13 further comprising an inertial member mechanically coupled to the diaphragm, the cavity being sized and shape to let the inertial member freely move when the housing is subjected to the force.

15. The optical sensing system of claim 14 wherein the sensing optical fiber is wrapped into a roll of optical fiber, the roll of optical fiber being attached to a face of the diaphragm and being concentrically positioned with the inertial member.

16. The optical sensing system of claim 14 wherein the diaphragm is a first diaphragm, the deformable member including a second diaphragm mounted inside the housing and extending in a plane parallel and spaced from a plane of the first diaphragm, the first and second diaphragms dividing the cavity into at least two sub cavities, the housing further comprising at least one through opening exposing one of the at least two sub cavities, the sensing optical fiber lying in another one of the at least two sub cavities.

17. The optical sensing system of claim 12 wherein the deformable member includes a deformable tubular member mounted inside the housing and extending along the sensing orientation between two extremities of the deformable tubular member, the sensing optical fiber being attached to an interior surface of the deformable tubular member.

18. The optical sensing system of claim 16 further comprising an inertial member mechanically coupled to a first extremity of the deformable tubular frame, the cavity being sized and shaped to let the inertial member freely move when the housing is subjected to the force.

19. The optical sensing system of claim 18 wherein the deformable member further comprises a diaphragm mounted inside the housing and to a second extremity of the deformable tubular member, dividing the cavity into at least two sub cavities, the sensing optical fiber lying in one of the at least two sub cavities, the housing having at least one through aperture in another one of the at least two sub cavities.

20. The optical sensing system of claim 11 wherein the deformable member is made integral to the frame.

* * * * *